US012718174B2

(12) United States Patent
Combs et al.

(10) Patent No.: US 12,718,174 B2
(45) Date of Patent: Aug. 25, 2026

(54) SYSTEM AND METHOD FOR IMPLEMENTING A RESPONSIBLE ARTIFICIAL INTELLIGENCE (AI) COMMON CONTROLS FRAMEWORK

(71) Applicant: KPMG LLP, New York, NY (US)

(72) Inventors: Kelly Combs, Chicago, IL (US); Swaminathan Chandrasekaran, Coppell, TX (US); Sreekar Krishna, Phoenix, AZ (US); Na Li, Austin, TX (US); Martin Sokalski, Chicago, IL (US); Yiwen Zhang, New York, NY (US)

(73) Assignee: KPMG LLP, New York, NY (US)

( * ) Notice: Subject to any disclaimer, the term of this patent is extended or adjusted under 35 U.S.C. 154(b) by 146 days.

(21) Appl. No.: 18/384,148

(22) Filed: Oct. 26, 2023

(65) Prior Publication Data

US 2024/0144147 A1 May 2, 2024

Related U.S. Application Data

(60) Provisional application No. 63/419,591, filed on Oct. 26, 2022.

(51) Int. Cl.
*G06Q 10/0639* (2023.01)
*G06N 20/20* (2019.01)
*G06Q 10/0635* (2023.01)

(52) U.S. Cl.
CPC ....... *G06Q 10/06393* (2013.01); *G06N 20/20* (2019.01); *G06Q 10/0635* (2013.01)

(58) Field of Classification Search
CPC ......... G06Q 10/06393; G06Q 10/0635; G06N 20/20
See application file for complete search history.

(56) References Cited

U.S. PATENT DOCUMENTS 10,817,520 B1 * 10/2020 Zhang ............... G06F 16/24578
2016/0063424 A1 * 3/2016 Zeng .................. H04L 43/0888 705/7.39
2016/0104093 A1 * 4/2016 Fletcher ........... G06Q 10/06393 705/7.39
2016/0179900 A1 * 6/2016 Stefik ................ G06Q 10/0637 707/771
2017/0364825 A1 * 12/2017 Tiell ................... G06Q 10/0635
2018/0189797 A1 * 7/2018 Ravi .................... G06Q 30/018
2019/0287031 A1 * 9/2019 Mondal ................... H04L 65/80
(Continued)

FOREIGN PATENT DOCUMENTS

CN 112889005 B * 7/2024 ............ G03F 7/705

OTHER PUBLICATIONS

"Model Artificial Intelligence Governance Framework" (https://ai.bsa.org/wp-content/uploads/2019/09/Model-AI-Framework-First-Edition.pdf) (2019) (Year: 2019).*

*Primary Examiner* — Sujay Koneru
(74) *Attorney, Agent, or Firm* — Hunton Andrews Kurth LLP

(57) ABSTRACT

The invention relates to computer-implemented systems and methods for implementing an innovative Responsible AI Common Controls framework for AI Governance. The system of an embodiment of the present invention focuses on connectivity, communication, automation, reporting and case management around critical AI Governance controls.

20 Claims, 14 Drawing Sheets

(56) References Cited

U.S. PATENT DOCUMENTS

| | | | | |
|---|---|---|---|---|
| 2019/0312800 | A1* | 10/2019 | Schibler | H04L 63/1433 |
| 2020/0065208 | A1* | 2/2020 | Vijendra | G06F 11/3447 |
| 2020/0366699 | A1* | 11/2020 | Sampaio | G06F 16/24568 |
| 2020/0372557 | A1* | 11/2020 | Peters | G06Q 10/30 |
| 2021/0313049 | A1* | 10/2021 | Khan | G16H 10/60 |
| 2021/0342836 | A1* | 11/2021 | Cella | G06N 7/01 |
| 2021/0406802 | A1* | 12/2021 | Banerjee | G06Q 10/06393 |
| 2022/0036201 | A1* | 2/2022 | Tamir | G06N 20/10 |
| 2022/0038928 | A1* | 2/2022 | Gupta | H04W 24/08 |
| 2022/0058591 | A1* | 2/2022 | Xiong | G06F 18/2113 |
| 2022/0198044 | A1* | 6/2022 | Madhavan | G06Q 50/265 |
| 2022/0309418 | A1* | 9/2022 | Chivukula | G06F 8/71 |
| 2022/0382615 | A1* | 12/2022 | Turk | G06F 11/079 |
| 2024/0202405 | A1* | 6/2024 | Lang | G06F 30/27 |
| 2025/0356243 | A1* | 11/2025 | Gadupudi | G06N 3/047 |

* cited by examiner

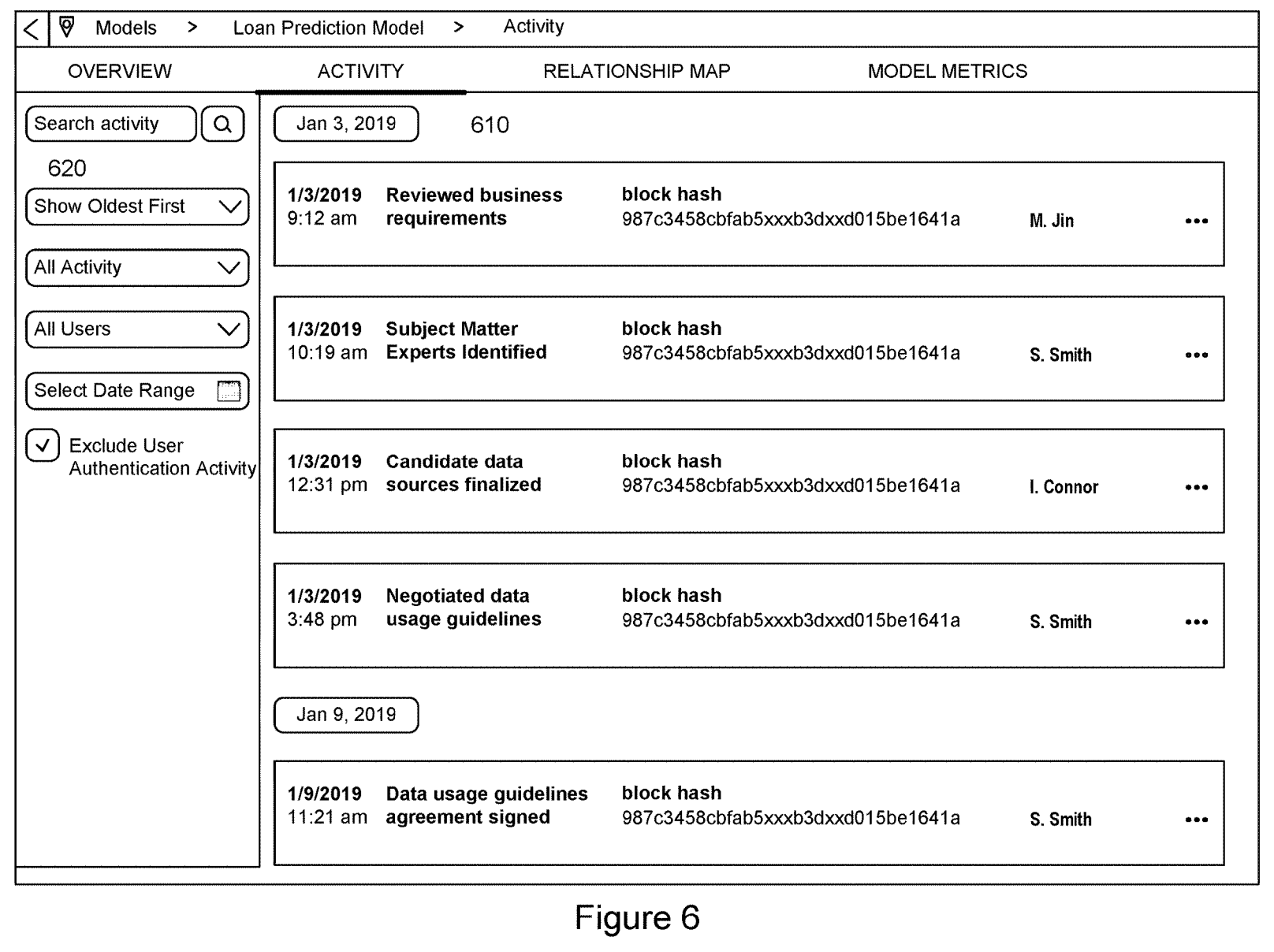

Models > Loan Prediction Model > Activity
OVERVIEW
ACTIVITY
RELATIONSHIP MAP
MODEL METRICS
Search activity
620
Show Oldest First
All Activity
All Users
Select Date Range
Exclude User Authentication Activity
Jan 3, 2019
610
1/3/2019 9:12 am Reviewed business requirements block hash 987c3458cbfab5xxxb3dxxd015be1641a M. Jin
1/3/2019 10:19 am Subject Matter Experts Identified block hash 987c3458cbfab5xxxb3dxxd015be1641a S. Smith
1/3/2019 12:31 pm Candidate data sources finalized block hash 987c3458cbfab5xxxb3dxxd015be1641a I. Connor
1/3/2019 3:48 pm Negotiated data usage guidelines block hash 987c3458cbfab5xxxb3dxxd015be1641a S. Smith
Jan 9, 2019
1/9/2019 11:21 am Data usage guidelines agreement signed block hash 987c3458cbfab5xxxb3dxxd015be1641a S. Smith

Figure 6

Figure 9:
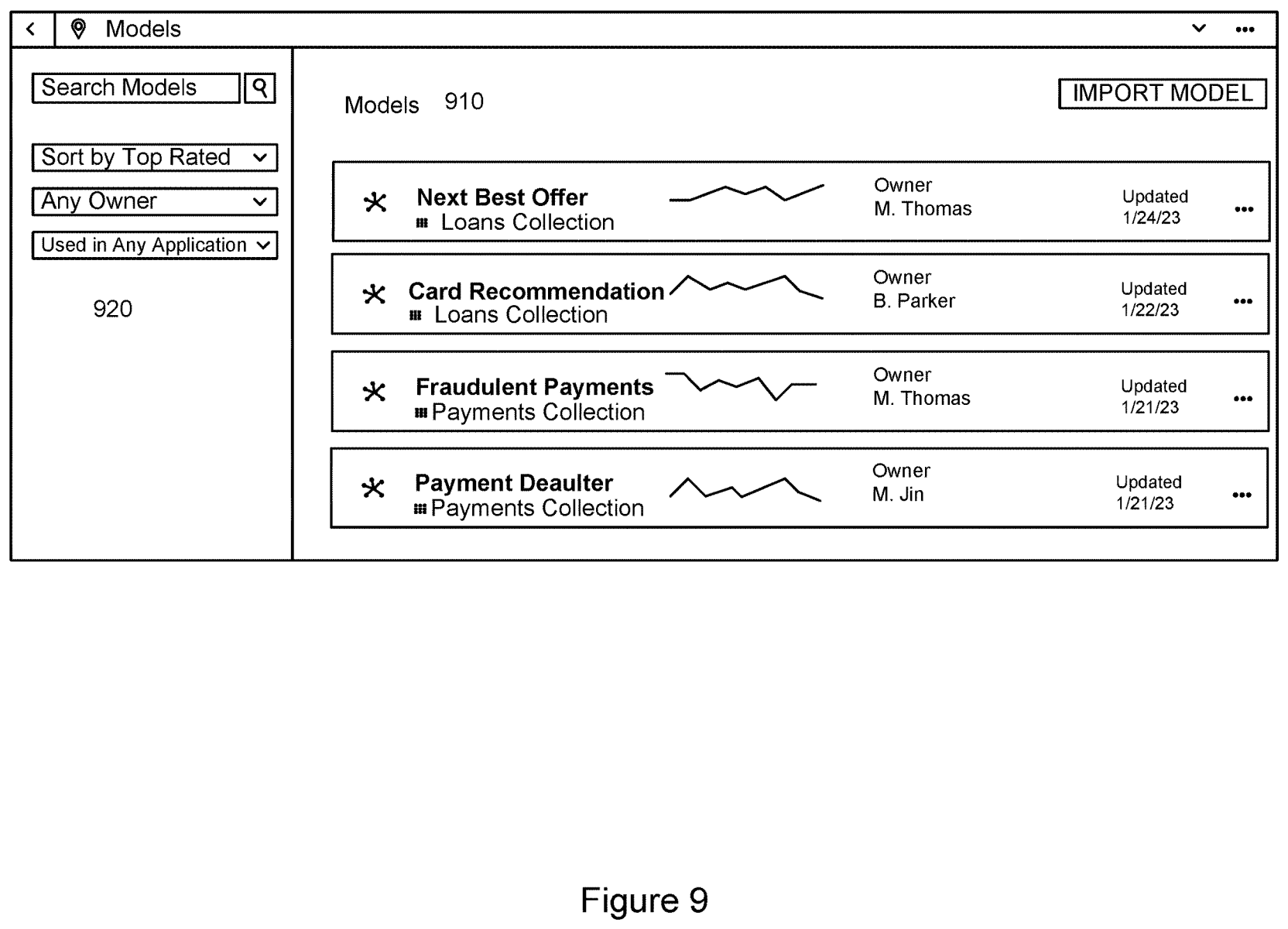

Models

Search Models

Sort by Top Rated

Any Owner

Used in Any Application

920

Models 910

IMPORT MODEL

Next Best Offer
Loans Collection
Owner
M. Thomas
Updated
1/24/23

Card Recommendation
Loans Collection
Owner
B. Parker
Updated
1/22/23

Fraudulent Payments
Payments Collection
Owner
M. Thomas
Updated
1/21/23

Payment Deaulter
Payments Collection
Owner
M. Jin
Updated
1/21/23

SYSTEM AND METHOD FOR IMPLEMENTING A RESPONSIBLE ARTIFICIAL INTELLIGENCE (AI) COMMON CONTROLS FRAMEWORK

CROSS REFERENCE TO RELATED APPLICATIONS

The application claims priority to U.S. Provisional Application 63/419,591, filed Oct. 26, 2022, the contents of which are incorporated by reference herein in their entirety.

FIELD OF THE INVENTION

The present invention generally relates to implementing a responsible AI common controls framework for AI governance.

BACKGROUND

Many entities rely on Artificial Intelligence for a range of product and service offerings as well as internal management of data. As the use of AI increases, entities are required to deploy AI responsibly and ethically. Responsible Artificial Intelligence (AI) generally refers to a governance framework that indicates how an organization or entity addresses the challenges around artificial intelligence. This may involve designing, developing and deploying AI with good intentions and fairness towards customers and society. Responsible AI makes the use of AI more reasonable and trustable.

Most companies, however, are not equipped to translate these principles—much of which seem subjective and open-ended—into concrete governance and control.

It would be desirable, therefore, to have a system and method that could overcome the foregoing disadvantages of known systems.

SUMMARY

According to one embodiment, the invention relates to a system that implements a responsible AI common controls framework for AI governance. The system comprises: a data connector that communicates with one or more tools comprising Continuously Integrate/Continuously Deploy (CI/CD) toolchain, a standards policy engine and AI toolchain integrator; a first database that stores and manages responsible AI controls that map to one or more regulations, laws, bulletins and guidelines; a second database that stores and manages data relating to one or more Key Performance Indicators (KPI) and Key Risk Indicators (KRIs) that map to one or more regulatory principles; an administrator portal that receives one or more configuration controls; and a computer processor that is coupled to the data connector, the first database, the second database and the administrator portal and further programmed to perform the steps of: identifying an AI model via the data connector; identifying a set of KPIs and KRIs for the AI model; applying a suite of algorithms specific to the set of KPIs and KRIs for the AI model to evaluate an overall risk; responsive to applying each algorithm of the suite of algorithms, generating a score that relates to a responsible AI metric; generating an output that compiles each score for each algorithm into a report format; and enabling a reviewer to review the output and determine whether to approve the AI model.

According to another embodiment, the invention relates to a method that implements a responsible AI common controls framework for AI governance. The method comprises the steps of: identifying an AI model via a data connector, wherein the data connector communicates with one or more tools comprising Continuously Integrate/Continuously Deploy (CI/CD) toolchain, a standards policy engine and AI toolchain integrator; identifying a set of Key Performance Indicators (KPI) and Key Risk Indicators (KRIs) for the AI model, wherein a database stores and manages data relating to one or more KPIs and KPIs that map to one or more regulatory principles; applying a suite of algorithms specific to the set of KPIs and KRIS for the AI model to evaluate an overall risk; responsive to applying each algorithm of the suite of algorithms, generating a score that relates to a responsible AI metric; generating an output that compiles each score for each algorithm into a report format; and enabling a reviewer to review the output and determine whether to approve the AI model.

The invention also relates a computer-readable medium containing program instructions for executing a method that implements a responsible AI common controls framework for AI governance.

An embodiment of the present invention is directed to an innovative solution that captures responsible AI common controls framework and accounts for responsibility, AI safety and security, fairness, explainability, resiliency, robustness, repeatability, privacy, right of use of data, relevancy, etc. An embodiment of the present invention provides defined controls from a responsible AI perspective and helps clients implement these controls in their existing systems. As new and more strict regulations are introduced, an embodiment of the present invention may dynamically update and design controls to help clients implement responsible AI effectively, efficiently and correctly.

These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

FIG. 6 is an exemplary user interface, according to an embodiment of the present invention.

FIG. 9 is an exemplary user interface, according to an embodiment of the present invention.

FIG. 13 is an exemplary user interface, according to an embodiment of the present invention.

DETAILED DESCRIPTION

Exemplary embodiments of the invention will now be described in order to illustrate various features of the invention. The embodiments described herein are not intended to be limiting as to the scope of the invention, but rather are intended to provide examples of the components, use, and operation of the invention.

An embodiment of the present invention is directed to a system implementation that captures an innovative Responsible AI Common Controls framework for AI Governance. The system of an embodiment of the present invention focuses on connectivity, communication, automation, reporting and case management around critical AI Governance controls. The AI Governance controls may include controls around Accountability and Responsibility for decisions over the use of data and AI, Ethical data and AI usage for business use cases, AI Safety and Security requirements, Fairness of the use of data and models, Explainability around the decision support provided or executed by AI, Resiliency of the AI models in unknown real-world data environments, Robustness against unknown changes to data and systems, Repeatability of the AI systems, Privacy/Right of use for data and AI, Relevancy to use cases for which the data and model has been purposed, and Model Simplification. Other governance controls may be identified and implemented in accordance with the various embodiments of the present invention.

Figure 1:
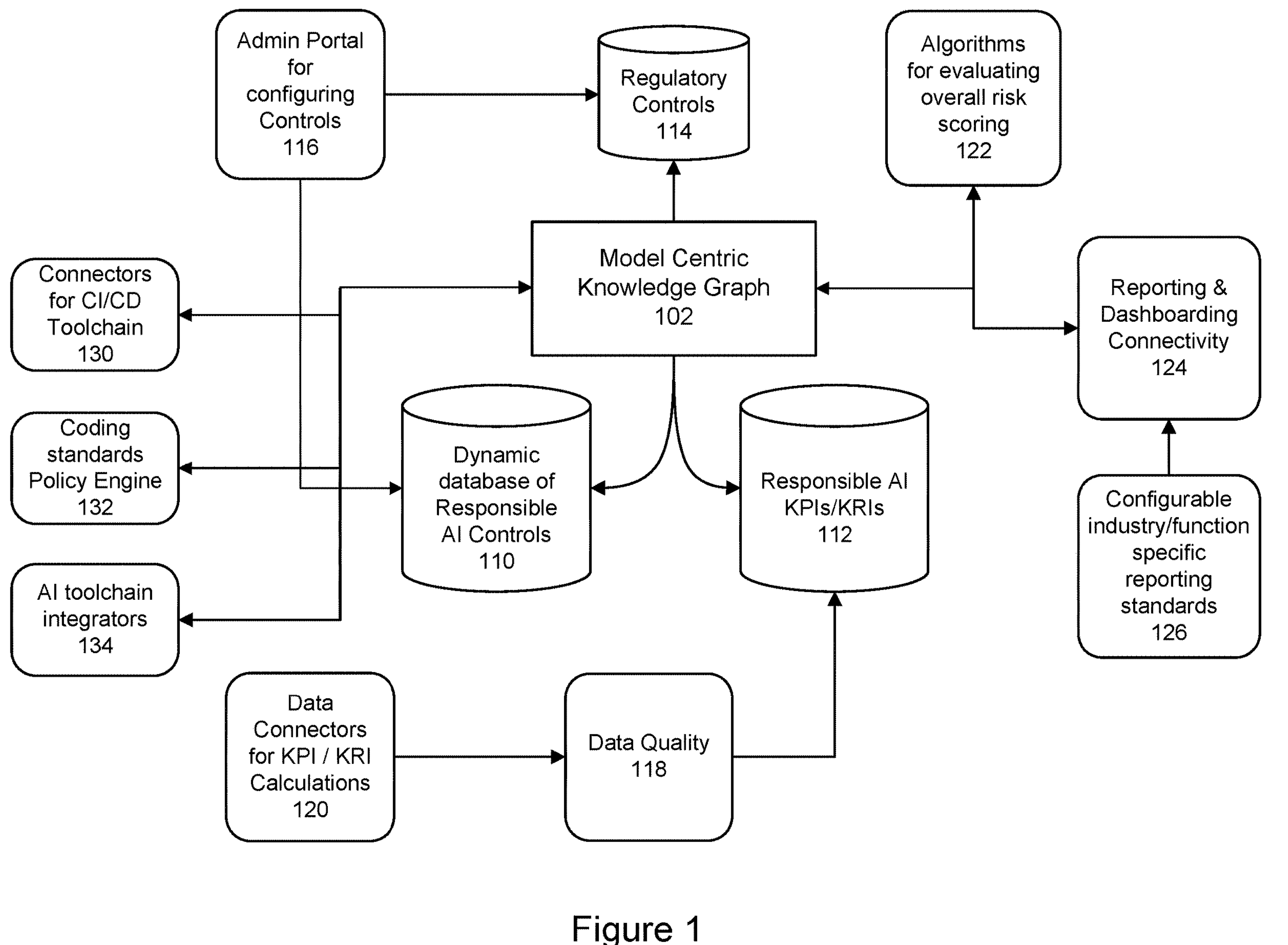
FIG. 1 illustrates exemplary system diagram, according to an embodiment of the present invention.

FIG. 1 illustrates an exemplary system diagram, according to an embodiment of the present invention. As shown in FIG. 1, an embodiment of the present invention is directed to a system that implements a Responsible AI Common Controls Framework. Various features may include: a dynamic database of designed controls, shown by 110, that maps to various data (e.g., geographic, country, state, local, etc.) and AI regulatory laws, bulletins, and guidance. Regulatory controls may be stored and managed at 114. Responsible AI Key Performance and Risk metrics (KPI's, KRI's), shown by 112, may map regulatory principles that external regulators are evaluating. Template/Tool may be used to evaluate external compliance readiness and ongoing performance (e.g., tool maps KPI's/KRI's to the dynamic database) for Responsible AI. Admin Portal 116 enables control configuration.

For example, a user may access Admin Portal 116 to deploy Responsible AI within a particular environment, company, etc. The user may configure a subset of controls that are specific to the company's business from a Responsible AI perspective. A social media company may have a different set of controls than a financial institution.

A Model Centric Knowledge Graph 102 maps into Responsible AI controls framework.

An embodiment of the present invention provides identification of, and connectivity with Data Evidence/Artifacts for reporting and monitoring control requirements on an ongoing basis. The system may also provide an assessment of data quality for controls reporting, thereby mapping into the KPIs/KRIs, as shown by 118. A collection of Data connectors, represented by 120, bring the right/appropriate data to enable the Responsible AI KPI/KRI measurement. In addition, algorithms for evaluating the overall risk scoring against the various Responsible AI KPIs/KRIs may be applied, as shown by 122. Data connectors may connect to various data sources to pull relevant data, apply appropriate KPIs/KRIs and generate a control score.

The system provides Templatized Responsible AI dashboards for deployment into various visualization tools as shown by 124. Configurable industry and/or function specific Responsible AI control sets and scripts may be provided at 126. For example, a script may evaluate bias within a given AI model for a human resources (HR) use case, evaluation of data and model for safety requirements.

For example, when a user launches a model, an embodiment of the present invention may be integrated with an approval pipeline where the system may rate the model and produce an output, such as a report or other output format. This enables a reviewer to review the analysis to ensure compliance with Responsible AI standards and determine whether to approve the model. According to another example, the approval may be automatically approved and then automatically implemented. For example, when the output includes scores and/or other metrics that are above a predetermined threshold or dynamically adjusted benchmark, an embodiment of the present invention may automatically implement the model. Other variations of automatic or partial automatic approval and implementation may be realized.

As shown in FIG. 1, an embodiment of the present invention identifies and analyzes AI models from a responsible AI perspective. A model may be identified through an AI Toolchain and/or other various data channels, e.g., 130, 132, 134.

Case Management integration with Governance, Risk, Control (GRC) toolchain supports evidence control achievement in document repository/workflow for Responsible AI. The system also supports integration into existing enterprise Continuously Integrate/Continuously Deploy (CI/CD) toolchain for standardizing ways of work in the software development lifecycle (SDLC) process for Responsible AI. Integration may be supported by Connectors for CI/CD toolchain 130, Coding Standards Policy Engine 132 and AI Toolchain Integrators 134.

By connecting to various systems and users through 130, an embodiment of the present invention may automatically prevent a data scientist, for example, from launching an AI model into service that fails to meet the responsible AI standards, as defined by a set of KPIs/KRIs.

Coding Standards Policy Engine 132 ensures that the code will be processed through the system and enforced by the Responsible AI controls.

AI Toolchain Integrators 134 provides Responsible AI controls to various tools used by a range of users, including data scientists. For example, a data scientist may use a specific data tool. In this example, AI Toolchain Integrators 134 may access and connect to the data tool and provide enforcements that are consistent and in compliance with preconfigured and relevant Responsible AI controls. When a user launches a model using the data tool, Responsible AI controls may now be integrated in the approval pipeline. An embodiment of the present invention may analyze and rate a model and then provide a corresponding report that details compliance with Responsible AI controls.

For example, a user, such as a data scientist, may submit a model through a connector. The model may be received by Model Centric Knowledge Graph 102 where data may be extracted and analyzed. The system may apply a suite of algorithms, via 122, to test for various features including fairness, security, privacy, etc., as defined and configured through Admin Portal 116. The suite of algorithms may be executed on the model where each algorithm may produce a corresponding score in an output. The output may include a confidence score corresponding to a metric, such as 90% confidence relating to data privacy 50% confidence relating to fairness, etc. The output enables a reviewer to decide whether to approve the model to production.

The algorithms may be executed automatically and scoring may be generated dynamically based on the configured controls. Controls that correspond to Responsible AI considerations and/or regulations, guidelines, etc. may be configured for a specific industry, company, entity, etc. Each time a new model is introduced, an embodiment of the present invention may analyze the model through a set of algorithms based on the configured controls prior to deployment.

According to an embodiment of the present invention, a set of KPIs/KRIs may be specific to an industry or even an entity. For example, some entities may be subject to more controls and/or regulations than others. A social media company may have more strict regulations as opposed to a software company. Through Admin Portal 116, a user may review a set of preconfigured KPIs/KRIs and decide on a subset as well as determine whether to add additional KPIs/KRIs that are specific to the entity.

For example, from a set of 100 preconfigured KPIs, a financial services company may decide to use a subset of thirty or so KPIs with an option to add new KPIs as well as modify existing ones. As regulations and controls are constantly updated, KPIs may be further modified/updated through Admin Portal 116.

According to another example, a company may generate a new Human Resources (HR) model. The model may be given employee details, compensation data, performance metric, etc. A new law may be introduced that prohibits AI from making labor decisions. Based on the new law, an embodiment of the present invention may develop a set of KPIs/KRIs to enforce fairness, etc. The set of KPIs/KRIs may be directed to whether a human approval pipeline is implemented. Accordingly, an embodiment of the present invention may evaluate each model to determine whether human approval was involved.

According to yet another example, a data scientist may use employee data from a group of employees to build a model. At a later time, one of the employees may depart and designate this employee's data for deletion. As the employee data is no longer compliant with data privacy regulations, an embodiment of the present invention may provide an alert that the employee data is now considered private and cannot be used in the model. In response, an embodiment of the present invention may generate substitute or equivalent data that has been approved to maintain compliance.

Figure 2:
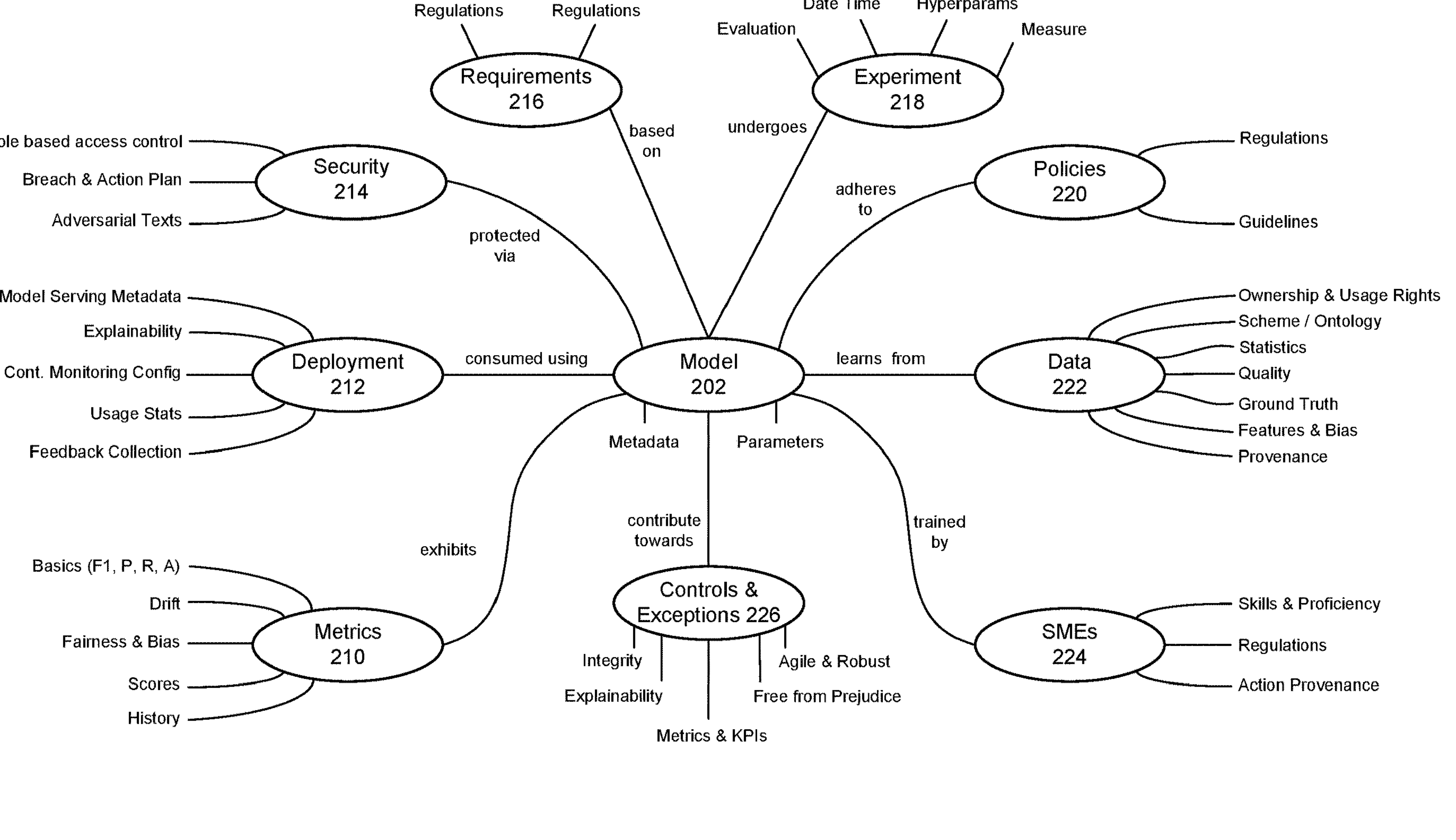
FIG. 2 is an exemplary knowledge graph diagram, according to an embodiment of the present invention.

FIG. 2 is an exemplary knowledge graph, according to an embodiment of the present invention. More specifically, FIG. 2 details a model centric knowledge graph as shown by Model 202. Models 202 may be defined by metadata, parameters, etc. As shown in FIG. 2, Model 202 may be defined by Metrics 210, Deployment 212, Security 214, Requirements 216, Experiment 218, Policies 220, Data 222 and SMEs 224. The exemplary AI Model may exhibit Metrics 210, such as Basics, Drift, Fairness and Bias, Scores, History, etc. Model 202 may be consumed using Deployment 212 including: metadata, explainability, continuous monitoring configuration, usage stats, feedback collection, etc. Model 202 may be protected via Security 214, such as role based access control, breach and action plan, adversarial texts, etc. Requirements 216 may be based on various regulations. Model 202 may undergo Experiment 218 including: evaluation, date/time, hyperparameters, measures, etc. Model 202 may adhere to Policies 220, such as regulations, guidelines, etc. Model 202 may learn from Data 222, such as ownership and usage rights, scheme/ontology, statistics, quality, ground truth, features and bias, provenance, etc. Model 202 may be trained by SMEs 224 as defined by: skills and proficiency, regulations, action provenance, etc. Model 202 may contribute towards Controls and Exceptions 226, such as integrity, explainability, metrics and KPIs, free from prejudice, agile and robustness, etc.

The various embodiments of the present invention may be relevant to applications including External Regulatory Compliance as well as Internal Compliance. Internal compliance may include: third Line of Defense (e.g., Internal Audit, etc.); second Line of Defense (e.g., Chief Risk/Compliance Officer, Model Risk Management, etc.); and first Line of Defense (e.g., IT Risk/Chief Data Officer/Head of Data Science, etc.).

An embodiment of the present invention is directed to enforcing responsibility on algorithms for evaluating overall risk scoring. This may involve designing and implementing an algorithm that imposes responsible constraints on other algorithms.

An embodiment of the present invention is directed to applying AI to monitor a regulatory pipeline and identify new changes/rules which may then be used to generate new KPIs/KRIs or update existing KPIs/KRIs. This may be realized by connecting with data sources or data streams that originate regulatory changes, such as bulletins, congressional notices, etc.

An embodiment of the present invention is directed to implementing a proactive system that provides responsibility guidance in real-time to data scientists during a model generation process.

Figure 3:
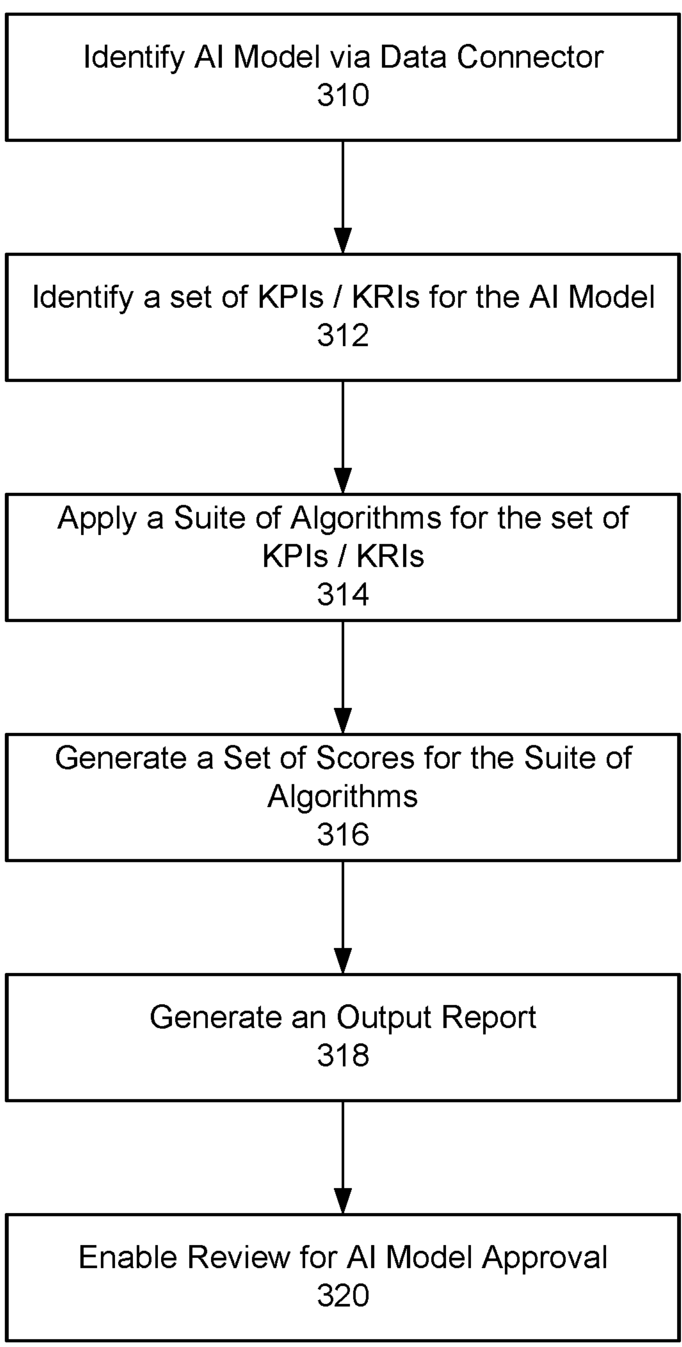
FIG. 3 is an exemplary flowchart, according to an embodiment of the present invention.

FIG. 3 is an exemplary flowchart, according to an embodiment of the present invention. At step 310, an AI model may be identified via a data connector. At step 312, a set of KPIs and/or KRIs may be identified for the AI model. The set of KPIs and/or Kills may be preconfigured through an Admin Portal or other input. Different entities with varying business goals and requirements may preconfigure different sets of KPIs and/or KRIs. At step 314, a suite of algorithms may be applied that are specific to the set of KPIs and/or KRIs for the AI model. At step 316, a score for each algorithm may be generated. The score may correspond to a responsible AI metric. At step 318, an output may be generated that compiles scores into a report format or other output. At step 320, a reviewer may determine whether to approve the AI model for deployment. For example, responsive to the output having scores within an acceptable range (e.g., above a threshold), the AI model may be automatically implemented. While the process of FIG. 3 illustrates certain steps performed in a particular order, it should be understood that the embodiments of the present invention may be practiced by adding one or more steps to the processes, omitting steps within the processes and/or altering the order in which one or more steps are performed.

Figure 4:
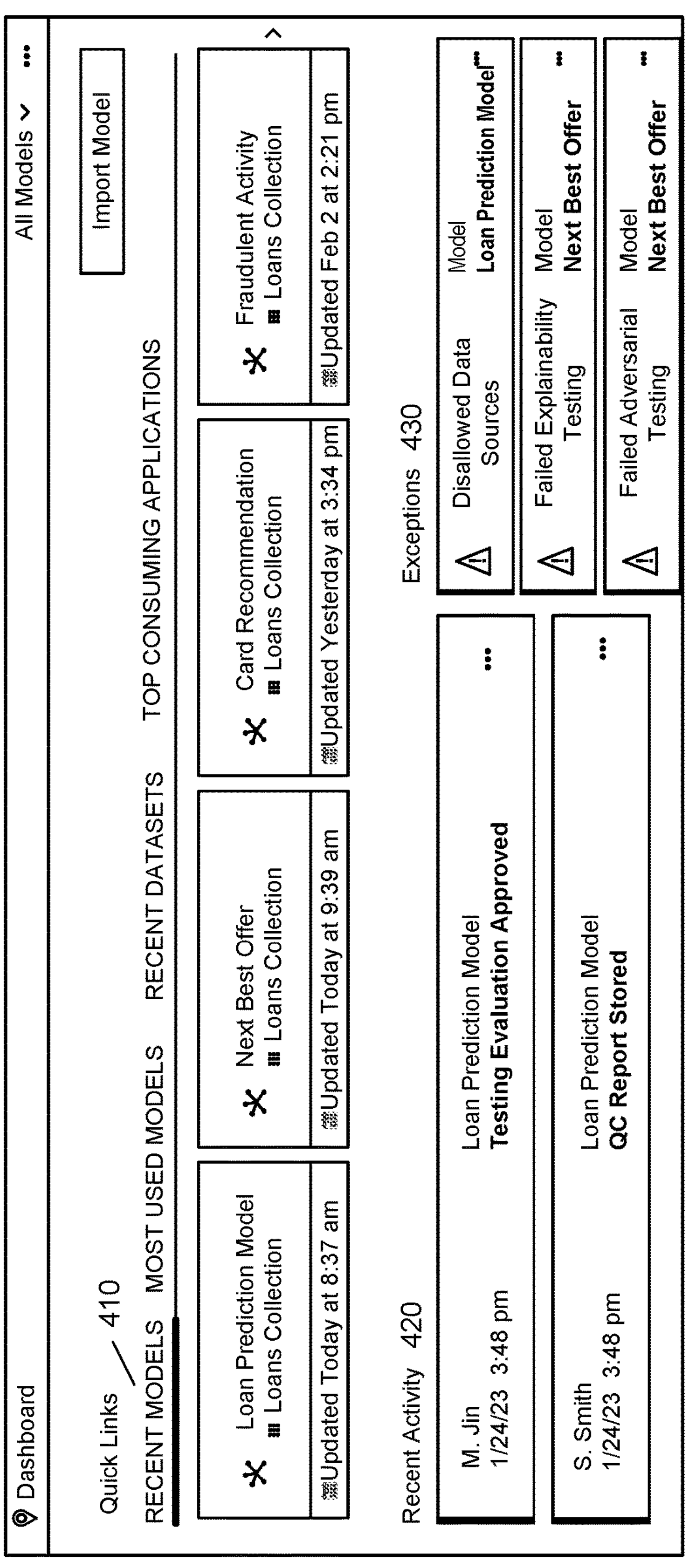
FIG. 4 is an exemplary user interface, according to an embodiment of the present invention.

FIG. 4 is an exemplary user interface, according to an embodiment of the present invention. FIG. 4 illustrates an exemplary dashboard that includes Recent Models, Most Used Models, Recent Datasets and Top Consuming Applications. Recent Models 410 may include: Loan Prediction Model, Next Best Offer, Card Recommendation and Fraudulent Activity.

Recent Activity may be shown at 420 and Exceptions shown at 430. Recent Activity 420 may include testing evaluation approved, QC report stored, etc. Exceptions 430 may include disallowed data sources; failed explainability testing, failed adversarial testing, etc.

Figure 5:
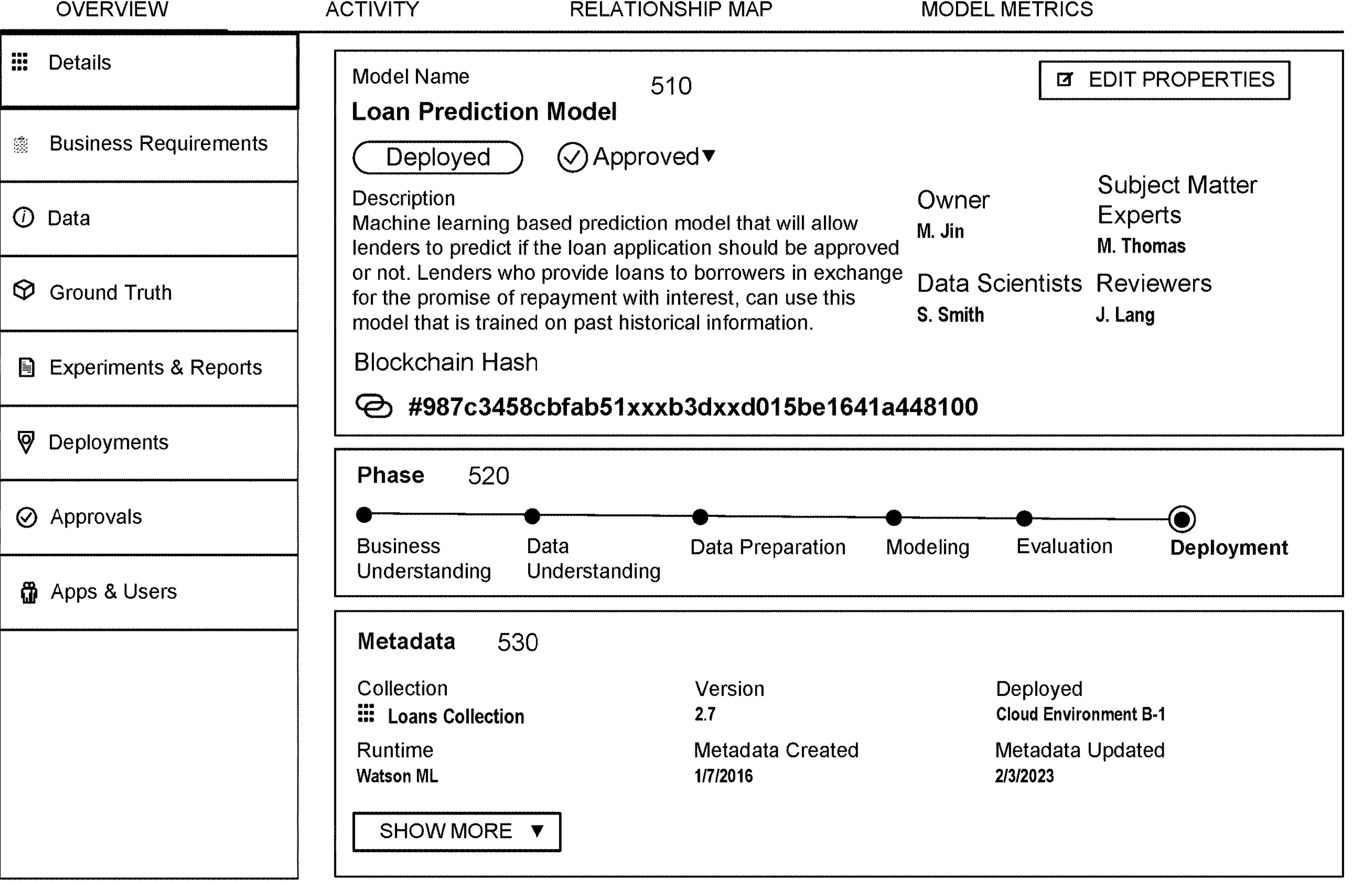
FIG. 5 is an exemplary user interface, according to an embodiment of the present invention.

FIG. 5 is an exemplary user interface, according to an embodiment of the present invention. FIG. 5 provides model details for Loan Prediction Model 510. Details may include status (e.g., Deployed, Approved, etc.); description; owner; data scientists; subject matter experts; reviewers; and blockchain hash. A graphic illustrating different phases may be shown at 520. Phases 520 may include: business understanding; data understanding; data preparation; modeling; evaluation and deployment. Metadata 530 may include details relating to collection; runtime; version; created date/time; deployed; metadata updated, etc.

FIG. 6 is an exemplary user interface, according to an embodiment of the present invention. Model activity may be shown in various graphics including a timeline 610. Each activity may include date/time; description of activity, block hash, and user/owner. Search features may include various filters as shown by 620.

Figure 7:
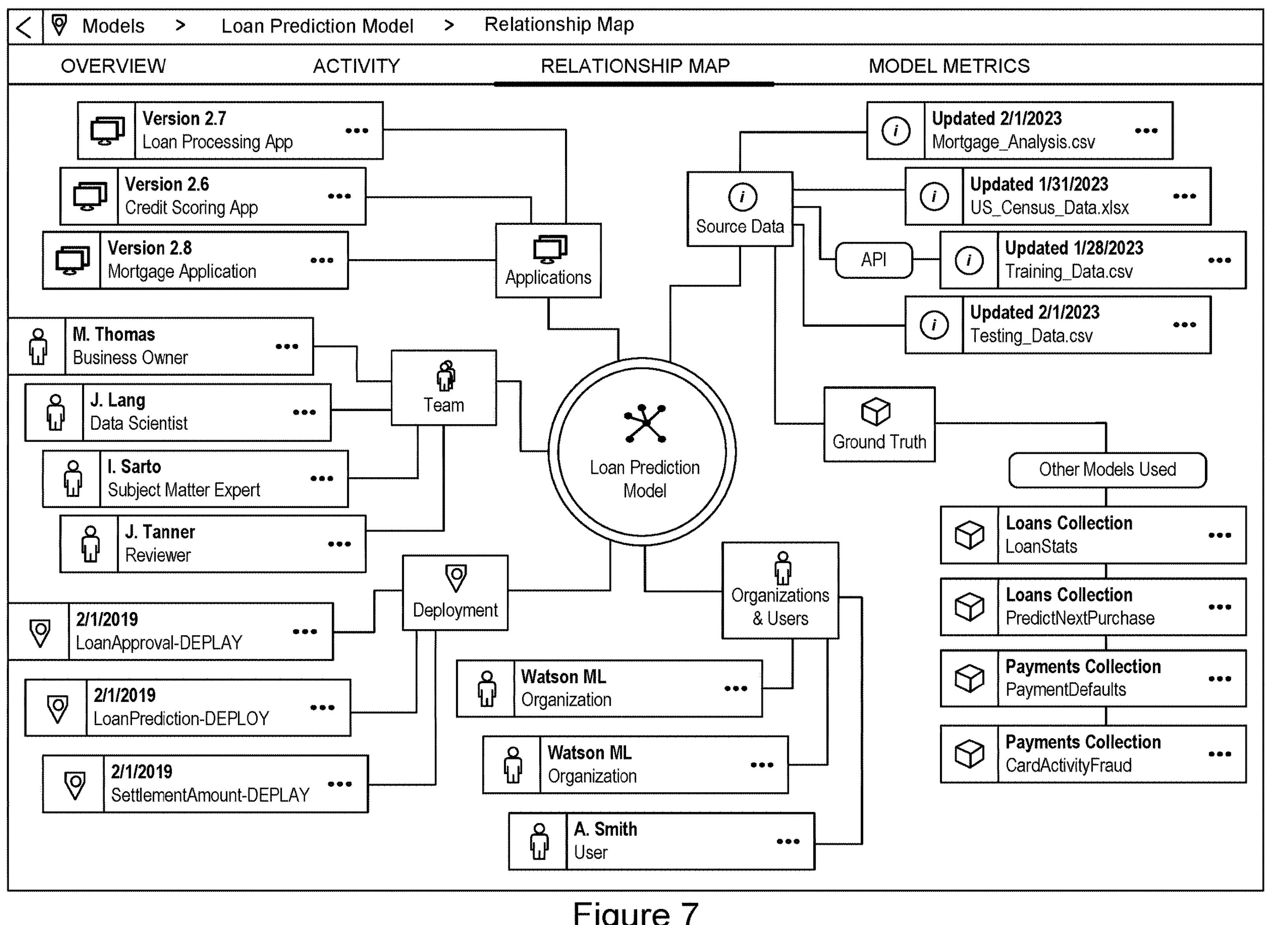
FIG. 7 is an exemplary user interface, according to an embodiment of the present invention.

FIG. 7 is an exemplary user interface, according to an embodiment of the present invention. A relationship map may be illustrated for a model, such as Loan Prediction Model. Relationship information may include details relating to Team, Applications, Source Data, Ground Truth, Organization & Users, Deployment etc.

Figure 8:
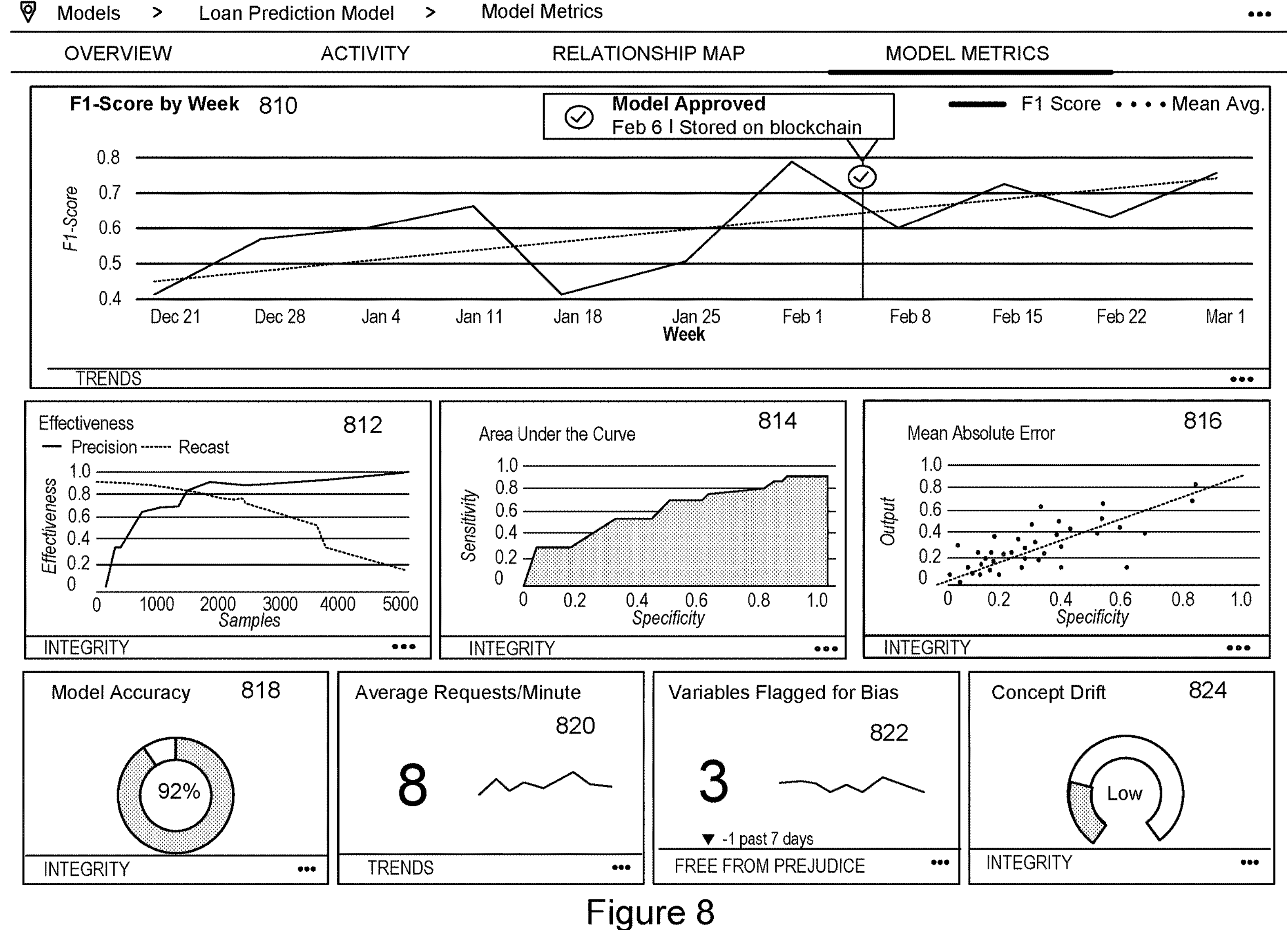
FIG. 8 is an exemplary user interface, according to an embodiment of the present invention.

FIG. 8 is an exemplary user interface, according to an embodiment of the present invention. Model metrics may be provided as Score by Week (or other time period) 810; Effectiveness 812; Area under the curve 814; Mean Absolute Error 816; Model Accuracy 818; Average Requests/Minute 820; Variables Flagged for Bias 822 and Concept Drift 824. Other metrics may be provided in various formats and graphics.

FIG. 9 is an exemplary user interface, according to an embodiment of the present invention. FIG. 9 illustrates models 910, such as Next Best Offer; Card Recommendation; Fraudulent Payments and Payment Defaulter. Models may be searched and sorted according to various factors as shown by 920.

Figure 10:
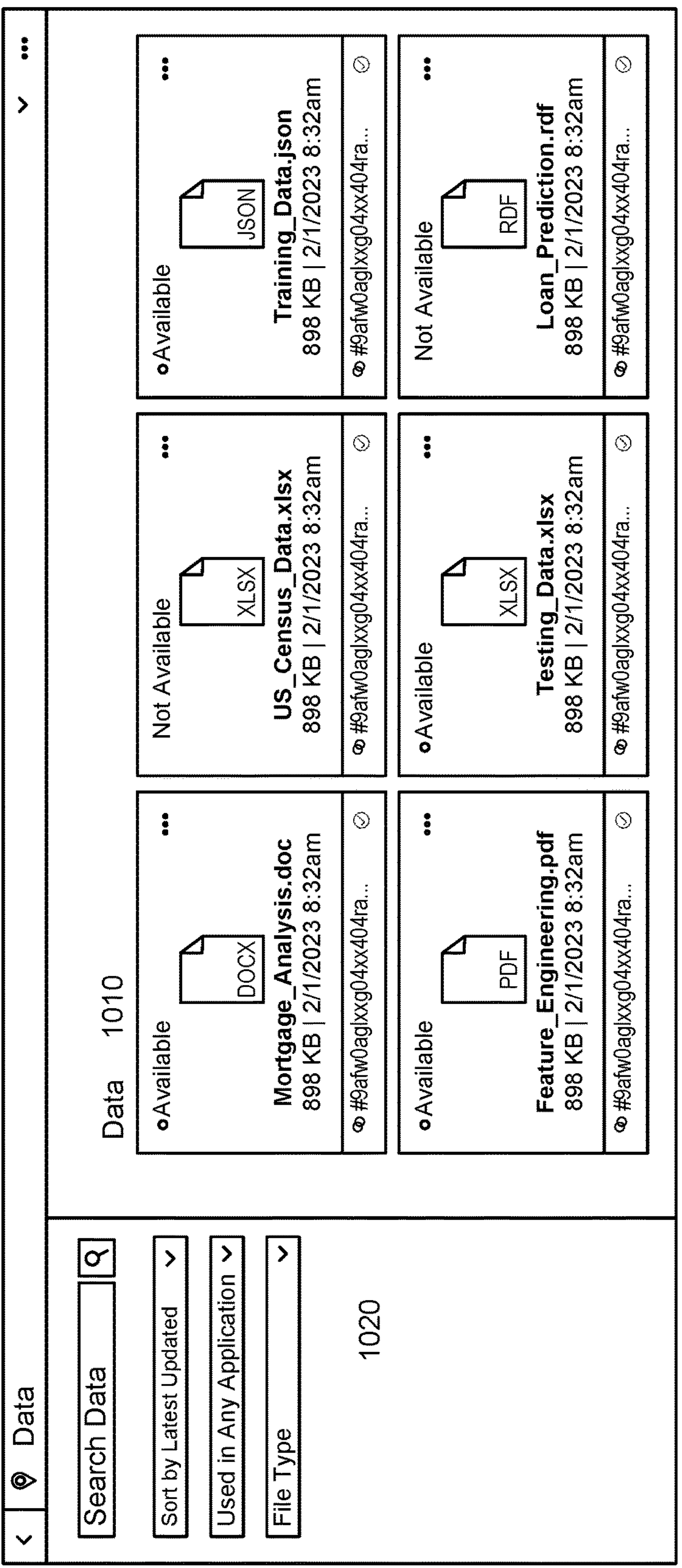
FIG. 10 is an exemplary user interface, according to an embodiment of the present invention.

FIG. 10 is an exemplary user interface, according to an embodiment of the present invention. FIG. 10 illustrates Data 1010, such as Mortgage Analysis; US Census Data; Training Data; Feature Engineering; Testing Data and Loan Prediction. Data may be searched and sorted according to various factors as shown by 1020.

Figure 11:
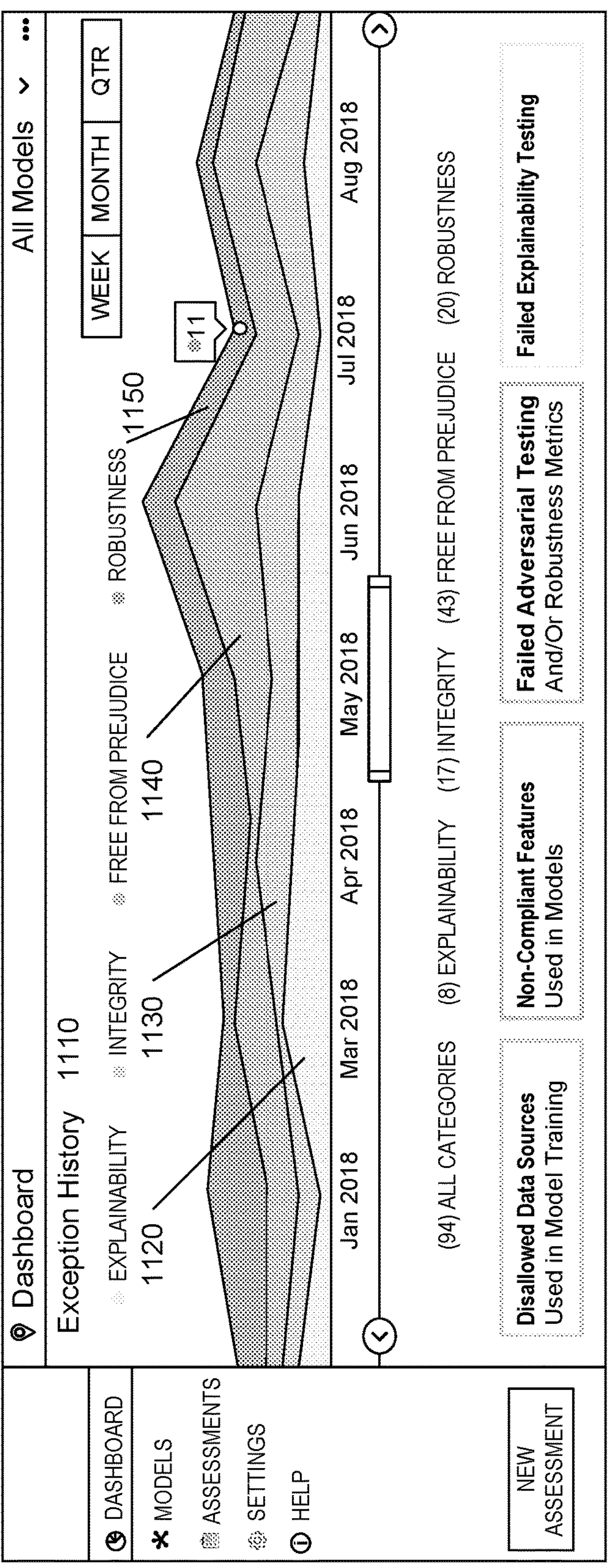
FIG. 11 is an exemplary user interface, according to an embodiment of the present invention.

FIG. 11 is an exemplary user interface, according to an embodiment of the present invention. FIG. 11 illustrates an exemplary dashboard including Exception History 1110 which details a set of categories such as Explainability 1120, Integrity 1130, Free from Prejudice 1140 and Robustness 1150 across a timeline. The timeline may capture various time periods, e.g., week, month, quarter, year, etc. Category details may include: Disallowed Data Sources; Non-Compliant Features; Failed Adversarial Testing; Failed Explainability Testing; Missing Crowdsourced Data Validation Report; Missing Business Requirements; Not Monitored for Fairness; Missing Model Adversarial Attacks Test Report; Missing Data Provenance; Not Monitored for Accuracy; Fairness Alerts; Missing Model QC Reports; and Accuracy Alerts.

Figure 12:
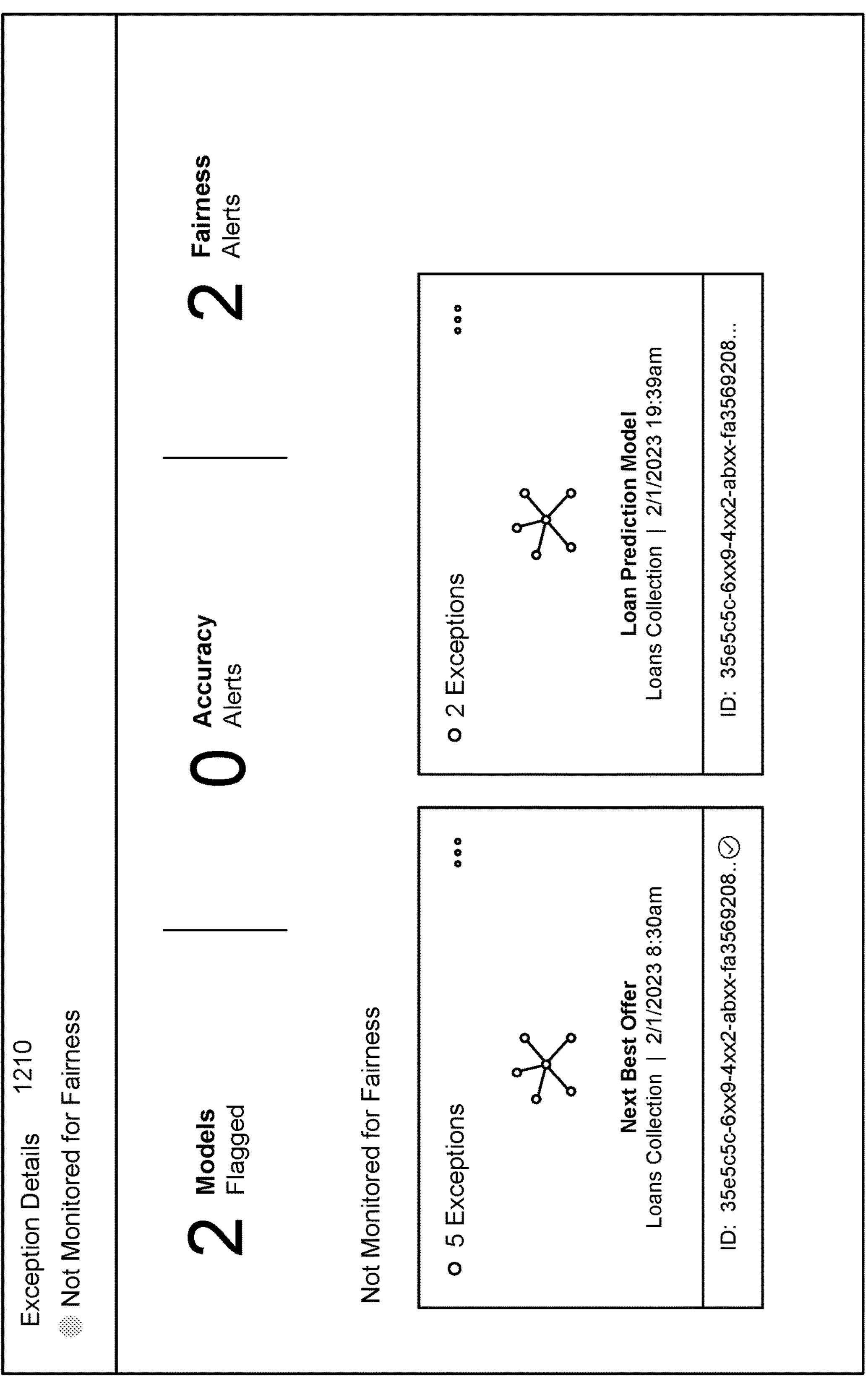
FIG. 12 is an exemplary user interface, according to an embodiment of the present invention.

FIG. 12 is an exemplary user interface, according to an embodiment of the present invention. Category details for Exception Details 1210 may include Models Flagged, Accuracy Alerts, and Fairness Alerts. Exceptions may be noted for Next Best Offer and Loan Prediction Model.

Figure 13:
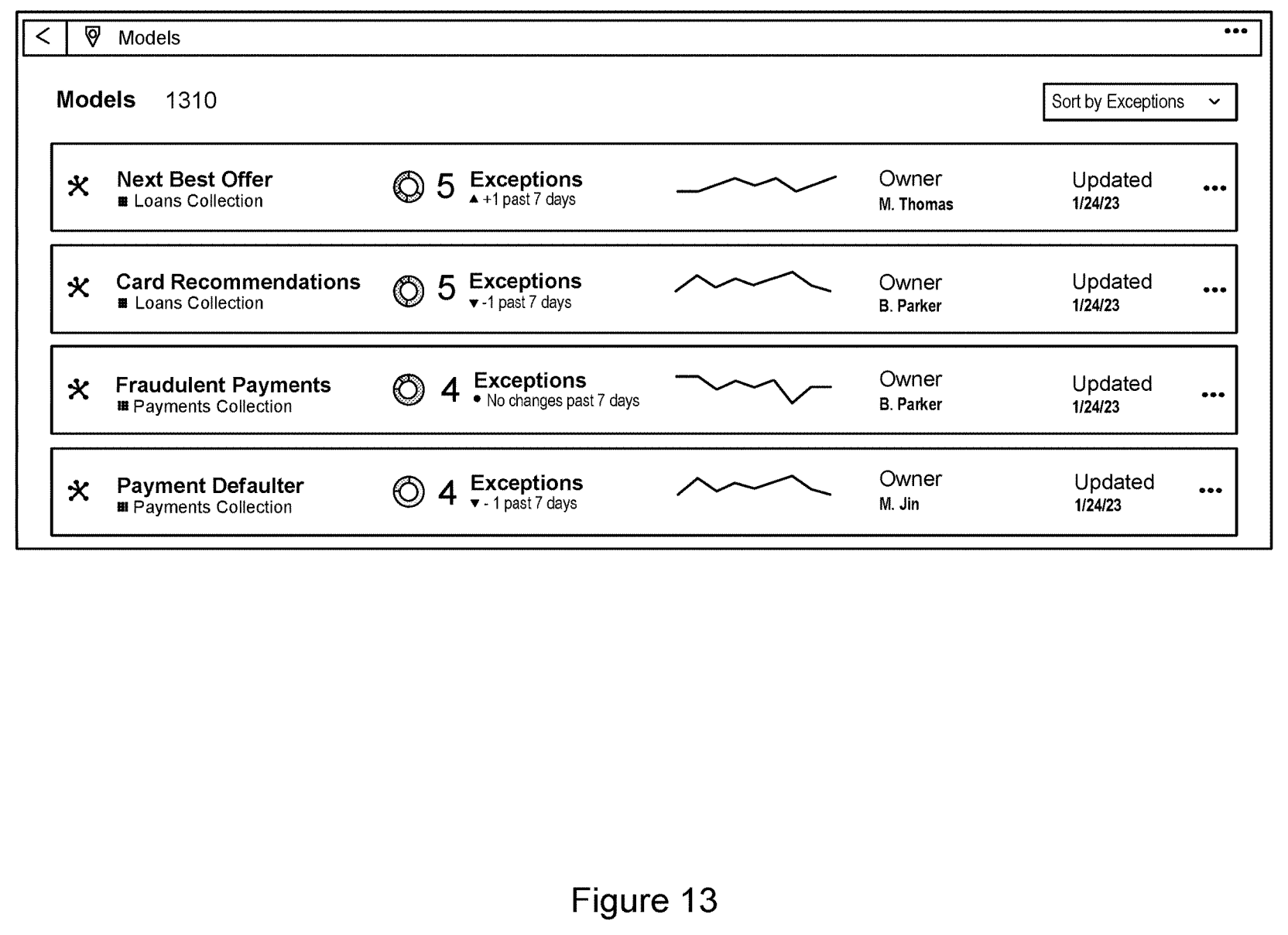

FIG. 13 is an exemplary user interface, according to an embodiment of the present invention. FIG. 13 illustrates Models and Exceptions. Models 1310 may include Next Best Offer; Card Recommendation; Fraudulent Payments; Payment Defaulter; Loan Prediction Model; Settlement Amount and Fraudulent Activity. Details may include a number of exceptions, trend data, owner data and date/time updated.

Figure 14:
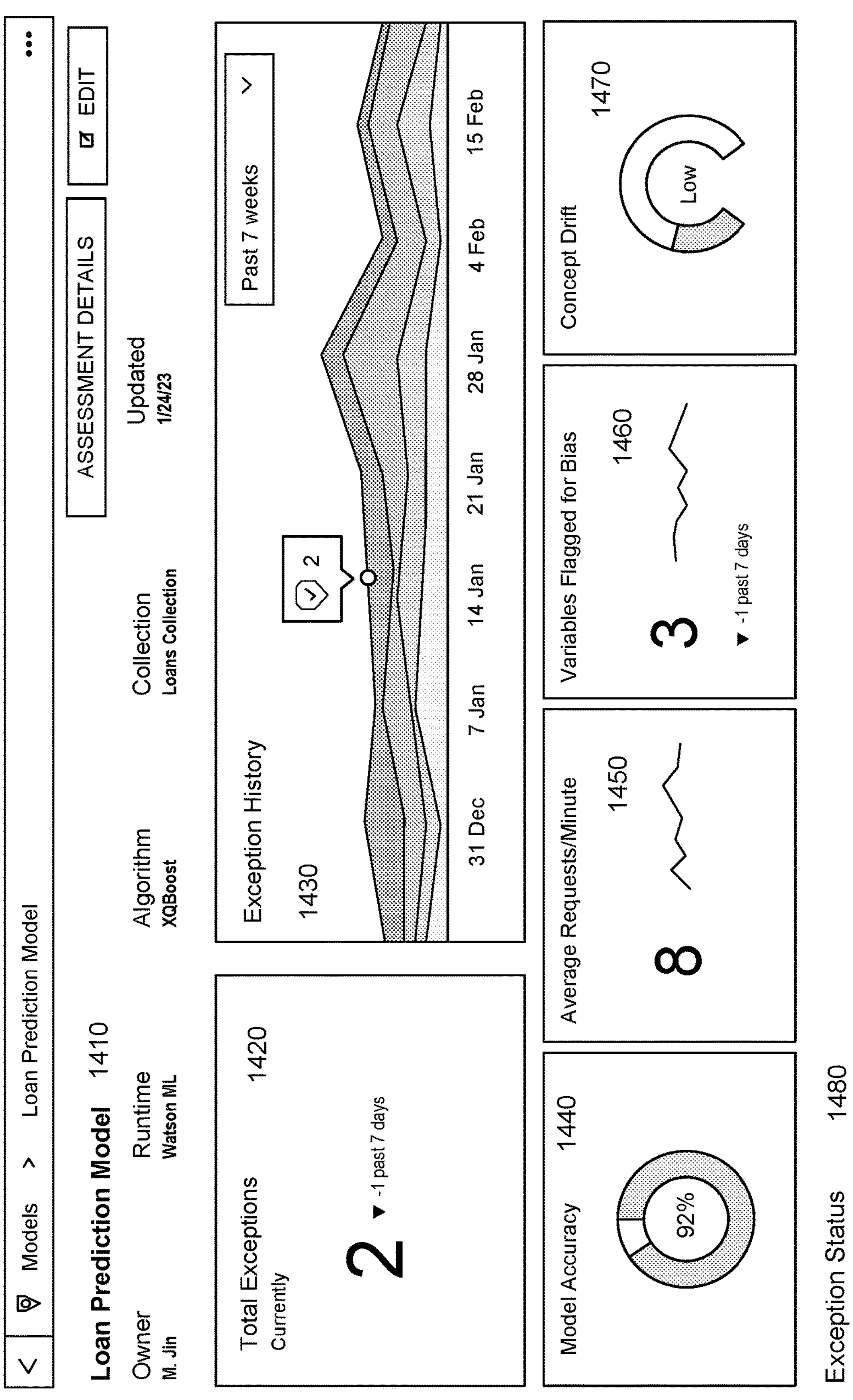
FIG. 14 is an exemplary user interface, according to an embodiment of the present invention.

FIG. 14 is an exemplary user interface, according to an embodiment of the present invention. FIG. 14 provides model details for a specific model, e.g., Loan Prediction Model 1410. Details may include owner, runtime, algorithm, collection and date/time updated. Other details may include: Total Exceptions 1420; Exception History 1430; Model Accuracy 1440; Average Requests/Minute 1450; Variable Flagged for Bias 1460; Concept Drift 1470; Exception Status 1480 (e.g., Disallowed Data Sources; Non-Compliant Features; Failed Adversarial Testing; Missing Crowdsourced Data Validation Report; Failed Explainability Testing; Missing Business Requirements, etc.), etc.

It will be appreciated by those persons skilled in the art that the various embodiments described herein are capable of broad utility and application. Accordingly, while the various embodiments are described herein in detail in relation to the exemplary embodiments, it is to be understood that this disclosure is illustrative and exemplary of the various embodiments and is made to provide an enabling disclosure. Accordingly, the disclosure is not intended to be construed to limit the embodiments or otherwise to exclude any other such embodiments, adaptations, variations, modifications and equivalent arrangements.

The foregoing descriptions provide examples of different configurations and features of embodiments of the invention. While certain nomenclature and types of applications/hardware are described, other names and application/hardware usage is possible and the nomenclature is provided by way of non-limiting examples only. Further, while particular embodiments are described, it should be appreciated that the features and functions of each embodiment may be combined in any combination as is within the capability of one skilled in the art. The figures provide additional exemplary details regarding the various embodiments.

Various exemplary methods are provided by way of example herein. The methods described can be executed or otherwise performed by one or a combination of various systems and modules.

The use of the term computer system in the present disclosure can relate to a single computer or multiple computers. In various embodiments, the multiple computers can be networked. The networking can be any type of network, including, but not limited to, wired and wireless networks, a local-area network, a wide-area network, and the Internet.

According to exemplary embodiments, the System software may be implemented as one or more computer program products, for example, one or more modules of computer program instructions encoded on a computer-readable medium for execution by, or to control the operation of, data processing apparatus. The implementations can include single or distributed processing of algorithms. The computer-readable medium can be a machine-readable storage device, a machine-readable storage substrate, a memory device, or a combination of one or more them. The term "processor" encompasses all apparatus, devices, and machines for processing data, including by way of example a programmable processor, a computer, or multiple processors or computers. The apparatus can include, in addition to hardware, software code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communications network.

A computer may encompass all apparatus, devices, and machines for processing data, including by way of example a programmable processor, a computer, or multiple processors or computers. It can include, in addition to hardware, code that creates an execution environment for the computer program in question, e.g., code that constitutes processor firmware, a protocol stack, a database management system, an operating system, or a combination of one or more of them.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computer-readable media suitable for storing computer program instructions and data can include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While the embodiments have been particularly shown and described within the framework for conducting analysis, it will be appreciated that variations and modifications may be affected by a person skilled in the art without departing from the scope of the various embodiments. Furthermore, one skilled in the art will recognize that such processes and systems do not need to be restricted to the specific embodiments described herein. Other embodiments, combinations of the present embodiments, and uses and advantages will be apparent to those skilled in the art from consideration of the specification and practice of the embodiments disclosed herein. The specification and examples should be considered exemplary.

What is claimed is:

1. A computer-implemented system that implements a responsible Artificial Intelligence (AI) common controls framework, the system comprising:

a data connector that communicates with one or more tools comprising Continuously Integrate/Continuously Deploy (CI/CD) toolchain, a standards policy engine and AI toolchain integrator;

a first database that stores and manages responsible AI controls that map to one or more regulations, laws, bulletins and guidelines;

a second database that stores and manages data relating to one or more Key Performance Indicators (KPI) and Key Risk Indicators (KRIs) that map to one or more regulatory principles;

an administrator portal that receives one or more configuration controls; and a computer processor that is coupled to the data connector, the first database, the second database and the administrator portal and further programmed to perform the steps of:

identifying an AI model via the data connector;

identifying a set of KPIs and KRIs for the AI model;

applying a suite of algorithms specific to the set of KPIs and KRIs for the AI model to evaluate an overall model risk;

responsive to applying each algorithm of the suite of algorithms, generating a score that relates to a responsible AI metric;

generating an output that compiles each score for each algorithm into a report format;

automatically approving the identified AI model based on one or more of the scores from the applied suite of algorithms exceeding a benchmark value; and automatically implementing the identified AI model based on the approval;

wherein the data connector is integrated into the CI/CD toolchain such that the data connector automatically receives and intercepts AI model deployment requests during a software development lifecycle process and prevents deployment of the identified AI model to a production environment prior to the AI model being launched into service when the one or more scores fail to exceed the benchmark value.

2. The computer-implemented system of claim 1, wherein the AI model is defined by metadata and parameters.

3. The computer-implemented system of claim 1, wherein the AI model exhibits one or more metrics comprising: drift, fairness, bias, scores and history.

4. The computer-implemented system of claim 1, wherein the AI model is protected via security comprising: role based access control, breach and action plan, and adversarial texts.

5. The computer-implemented system of claim 1, wherein the AI model adheres to one or more policies comprising: regulations and guidelines.

6. The computer-implemented system of claim 1, wherein the AI model learns from a set of data comprising: ownership and usage rights; scheme/ontology; statistics; quality; ground truth; features and bias; and provenance.

7. The computer-implemented system of claim 1, wherein the AI model is trained by subject matter experts based on: skills and proficiency, regulations and action provenance.

8. The computer-implemented system of claim 1, wherein the AI model contributes towards controls and exceptions relating to: integrity, explainability, metrics and KPIs, free from prejudice and agile and robustness.

9. The computer-implemented system of claim 1, wherein the computer processor is further programmed to perform the step of: responsive to the output having scores within an acceptable range, the AI model is automatically implemented.

10. The computer-implemented system of claim 1, wherein the set of KPIs and KRIs are preconfigured through the administrator portal.

11. A computer-implemented method that implements a responsible Artificial Intelligence (AI) common controls framework, the method comprising the steps of:

identifying an AI model via a data connector, wherein the data connector communicates with one or more tools comprising Continuously Integrate/Continuously Deploy (CI/CD) toolchain, a standards policy engine and AI toolchain integrator, identifying a set of Key Performance Indicators (KPI) and Key Risk Indicators (KRIs) for the AI model, wherein a database stores and manages data relating to one or more KPIs and KPIs that map to one or more regulatory principles;

applying a suite of algorithms specific to the set of KPIs and KRIs for the AI model to evaluate an overall model risk;

responsive to applying each algorithm of the suite of algorithms, generating a score that relates to a responsible AI metric;

generating an output that compiles each score for each algorithm into a report format;

automatically approving the identified AI model based on one or more of the scores from the applied suite of algorithms exceeding a benchmark value; and automatically implementing the identified AI model based on the approval;

wherein the data connector is integrated into the CI/CD toolchain such that the data connector automatically receives and intercepts AI model deployment requests during a software development lifecycle process and prevents deployment of the identified AI model to a production environment prior to the AI model being launched into service when the one or more scores fail to exceed the benchmark value.

12. The computer-implemented method of claim 11, wherein the AI model is defined by metadata and parameters.

13. The computer-implemented method of claim 11, wherein the AI model exhibits one or more metrics comprising: drift, fairness, bias, scores and history.

14. The computer-implemented method of claim 11, wherein the AI model is protected via security comprising: role based access control, breach and action plan, and adversarial texts.

15. The computer-implemented method of claim 11, wherein the AI model adheres to one or more policies comprising: regulations and guidelines.

16. The computer-implemented method of claim 11, wherein the AI model learns from a set of data comprising: ownership and usage rights; scheme/ontology; statistics; quality; ground truth; features and bias; and provenance.

17. The computer-implemented method of claim 11, wherein the AI model is trained by subject matter experts based on: skills and proficiency, regulations and action provenance.

18. The computer-implemented method of claim 11, wherein the AI model contributes towards controls and exceptions relating to: integrity, explainability, metrics and KPIs, free from prejudice and agile and robustness.

19. The computer-implemented method of claim 11, wherein the computer processor is further programmed to perform the step of: responsive to the output having scores within an acceptable range, the AI model is automatically implemented.

20. The computer-implemented method of claim 11, wherein the set of KPIs and KRIs are preconfigured through an administrator portal.

* * * * *